(12) United States Patent
Lahoda et al.

(10) Patent No.: US 10,803,999 B2
(45) Date of Patent: Oct. 13, 2020

(54) COATED U3SI2 PELLETS WITH ENHANCED WATER AND STEAM OXIDATION RESISTANCE

(71) Applicant: WESTINGHOUSE ELECTRIC COMPANY, LLC, Cranberry Township, PA (US)

(72) Inventors: Edward J. Lahoda, Edgewood, PA (US); Peng Xu, Columbia, SC (US); Lu Cai, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 124 days.

(21) Appl. No.: 15/898,308

(22) Filed: Feb. 16, 2018

(65) Prior Publication Data

US 2018/0268946 A1    Sep. 20, 2018

Related U.S. Application Data

(60) Provisional application No. 62/472,659, filed on Mar. 17, 2017.

(51) Int. Cl.
   *G21C 3/07* (2006.01)
   *G21C 21/02* (2006.01)
   (Continued)

(52) U.S. Cl.
   CPC ............... *G21C 3/07* (2013.01); *C01B 33/06* (2013.01); *G21C 3/20* (2013.01); *G21C 3/623* (2013.01);
   (Continued)

(58) Field of Classification Search
   CPC . G21C 3/07; G21C 21/02; G21C 3/20; G21C 3/626; G21C 3/623; G21C 3/045; C01B 33/06; Y02E 30/38; C01P 2004/80
   See application file for complete search history.

(56) References Cited

U.S. PATENT DOCUMENTS 4,751,041 A    6/1988   Ferrari
5,319,690 A *  6/1994   Glazman .................. G21C 3/20
                                                     376/419
(Continued)

FOREIGN PATENT DOCUMENTS

WO    2005/086173 A2    9/2005

OTHER PUBLICATIONS

K.E. Metzger et al. Model of U3Si2 Fuel System Using Bison Fuel Code, Proceeding of ICAPP, Apr. 6-9, 2014, Paper No. 14343, pp. 1-5.

(Continued)

*Primary Examiner* — Andrew J. Oyer
(74) *Attorney, Agent, or Firm* — K&L Gates LLP

(57) ABSTRACT

A method of forming a water resistant boundary on a fissile material for use in a water cooled nuclear reactor is described. The method comprises coating the fissile material, such as a pellet of $U_3Si_2$ and/or the grain boundaries, to a desired thickness with a suitable coating material, such as atomic layer deposition or a thermal spray process. The coating material may be any non-reactive material with a solubility at least as low as that of $UO_2$. Exemplary coating materials include $ZrSiO_4$, FeCrAl, Cr, Zr, Al—Cr, CrAl, $ZrO_2$, $CeO_2$, $TiO_2$, $SiO_2$, $UO_2$, $ZrB_2$, $Na_2O$—$B_2O_3$—$SiO_2$—$Al_2O_3$ glass, $Al_2O_3$, $Cr_2O_3$, carbon, and SiC, and combinations thereof. The water resistant layer may be overlayed with a burnable absorber layer, such as $ZrB_2$ or $B_2O_3$—$SiO_2$ glass.

20 Claims, 4 Drawing Sheets

(51) Int. Cl.
 *G21C 3/20* (2006.01)
 *C01B 33/06* (2006.01)
 *G21C 3/62* (2006.01)
 *G21C 3/04* (2006.01)

(52) U.S. Cl.
 CPC ............ G21C 3/626 (2013.01); G21C 21/02 (2013.01); *C01P 2004/80* (2013.01); *G21C 3/045* (2019.01); *Y02E 30/38* (2013.01)

(56) References Cited

U.S. PATENT DOCUMENTS

| | | | | |
|---|---|---|---|---|
| 5,475,723 | A | 12/1995 | Marlowe | |
| 2002/0121160 | A1* | 9/2002 | Bangert | E21B 19/07 81/57.5 |
| 2007/0064861 | A1* | 3/2007 | Sterbentz | G21C 3/02 376/409 |
| 2014/0173995 | A1* | 6/2014 | Bailey | E21B 10/00 51/295 |
| 2014/0185732 | A1 | 7/2014 | Ledford et al. | |
| 2015/0063521 | A1* | 3/2015 | Yacout | G21C 21/02 376/414 |
| 2015/0348652 | A1* | 12/2015 | Mazzoccoli | G21C 21/16 376/409 |

OTHER PUBLICATIONS

International Search Report and Written Opinion of the International Searching Authority for PCT/US2018/018587 dated May 21, 2018 (Forms PCT/ISA/220, PCT/ISA/210 and PCT/ISA/237).

\* cited by examiner

COATED U3SI2 PELLETS WITH ENHANCED WATER AND STEAM OXIDATION RESISTANCE

STATEMENT REGARDING GOVERNMENT RIGHTS

This invention was made with government support under Contract No. DE-NE0008222 awarded by the Department of Energy. The U.S. Government has certain rights in this invention.

BACKGROUND OF THE INVENTION

1. Field of the Invention

The invention relates to fuels for nuclear reactors, and more particularly to methods of improving water resistance of nuclear fuels.

2. Description of the Prior Art

Uranium dioxide ($UO_2$) is currently the primary uranium compound used in nuclear fuel worldwide. Efforts to enhance the safety and performance of light water reactors is behind research into alternative accident tolerant fuels. Several high density uranium fuels have been considered for use in existing light water reactors. One promising fuel is uranium silicide ($U_3Si_2$) due to its high uranium density (17% higher than $UO_2$), high thermal conductivity, and high melting temperature (1665° C.). See K. E. Metzger et al., Model of $U_3Si_2$ Fuel System Using Bison Fuel Code, Proceedings of ICAPP, Apr. 6-9, 2014, Paper No. 14343, pp. 1-5. However, recent testing has shown that $U_3Si_2$ may suffer from some situational problems and therefore may require additional features to remedy these potential problems.

SUMMARY OF THE INVENTION

A method of protecting fissile material from oxidation due to exposure to water or steam is described herein. It has been found that while $U_3Si_2$ has good water resistance at 300° C., similar to the more widely used fissile material $UO_2$, as water temperature increases, the grain boundaries of $U_3Si_2$ are preferentially attacked by water and steam.

Recent testing indicates that $U_3Si_2$ suffers excess oxidation at temperatures higher than 360° C. and will be completely oxidized in steam below 600° C. in a short period of time as shown in FIG. 1, a graph showing the results of thermogravitational analysis of $U_3Si_2$ in the water vapor atmosphere. Thermogravitational (TG) analysis is commonly used to determine selected characteristics of materials that exhibit either mass loss or gain due to, for example, decomposition or oxidation as a function of temperature. Commercially available TG analyzers continuously weigh a sample as it is heated to a target temperature, up to about 2000° C. As the temperature increases, various components of the sample are decomposed or oxidized and the weight percentage of each resulting mass change can be measured. Results are plotted with temperature on the X-axis and total mass change on the Y-axis. Significant changes in mass during heating indicates that the material is no longer thermally stable. With mass change of 16.87%, as shown in FIG. 1, $U_3Si_2$ completely oxidizes into uranium oxides ($UO_2$ and $U_3O_8$). The oxidation of the fission material could lead to significant safety concerns in design basis accidents such as a loss of coolant accident and hypothetical reactivity insertion accidents.

A method to protect fissile material from oxidation, in various aspects, comprises coating the fissile material. Coating $U_3Si_2$ pellets or protecting the $U_3Si_2$ grain boundaries, for example, will prevent pellet fragmentation and excess oxidation of the pellets by the coolant following leakage through the cladding barrier onto the fuel during reactor operation and by high temperature steam in design basis accident conditions if a cladding break occurs. To improve the water and steam oxidation resistance of $U_3Si_2$ or other suitable fissile materials at temperatures higher than 360° C., a water resistant coating is applied to the surface of the material using any suitable coating method. Exemplary coating methods include atomic layer deposition and thermal spray techniques such as plasma arc spray and physical vapor depositions and chemical vapor deposition. The coating materials may be any material that will coat, i.e., adhere to, the surface of the fissile material of choice, not react with the fissile material, have a solubility at least as low as and preferably less than that of $UO_2$, and be flexible enough to remain substantially in place, not spall from the $U_3 Si_2$, as the fissile material swells in use. To enhance commercial viability, the coating material is preferably easy to apply. In various aspects, a suitable coating material may be selected from the group consisting of $ZrSiO_4$, FeCrAl, Cr, Zr, Al—Cr, CrAl, $ZrO_2$, $CeO_2$, $TiO_2$, $SiO_2$, $UO_2$, $ZrB_2$, $Na_2O$—$B_2O_3$—$SiO_2$—$Al_2O_3$ glass, $Al_2O_3$, $Cr_2O_3$, carbon, and SiC, and combinations thereof.

A nuclear fuel material is also described. The material comprises a fissile material, such as $U_3Si_2$, coated with a water resistant layer. The coating layer, in various aspects, may be selected from the group consisting of $ZrSiO_4$, FeCrAl, Cr, Zr, Al—Cr, CrAl, $ZrO_2$, $CeO_2$, $TiO_2$, $SiO_2$, $UO_2$, $ZrB_2$, $Na_2O$—$B_2O_3$—$SiO_2$—$Al_2O_3$ glass, $Al_2O_3$, $Cr_2O_3$, carbon, and SiC, and combinations thereof.

The water resistant coating may lie beneath an integral fuel burnable absorber (IFBA) layer for controlling the core reactivity in nuclear reactor operation. The IFBA layer may be a thin layer of a zirconium compound, such as zirconium diboride ($ZrB_2$), a boron compound, such as $B_2O_3$—$SiO_2$ glass, and combinations of a zirconium compound and a boron compound. See for example, U.S. Pat. No. 4,751,041, incorporated herein by reference.

BRIEF DESCRIPTION OF THE DRAWINGS

The characteristics and advantages of the present disclosure may be better understood by reference to the accompanying figures.

DESCRIPTION OF THE PREFERRED EMBODIMENTS

Figure 1:
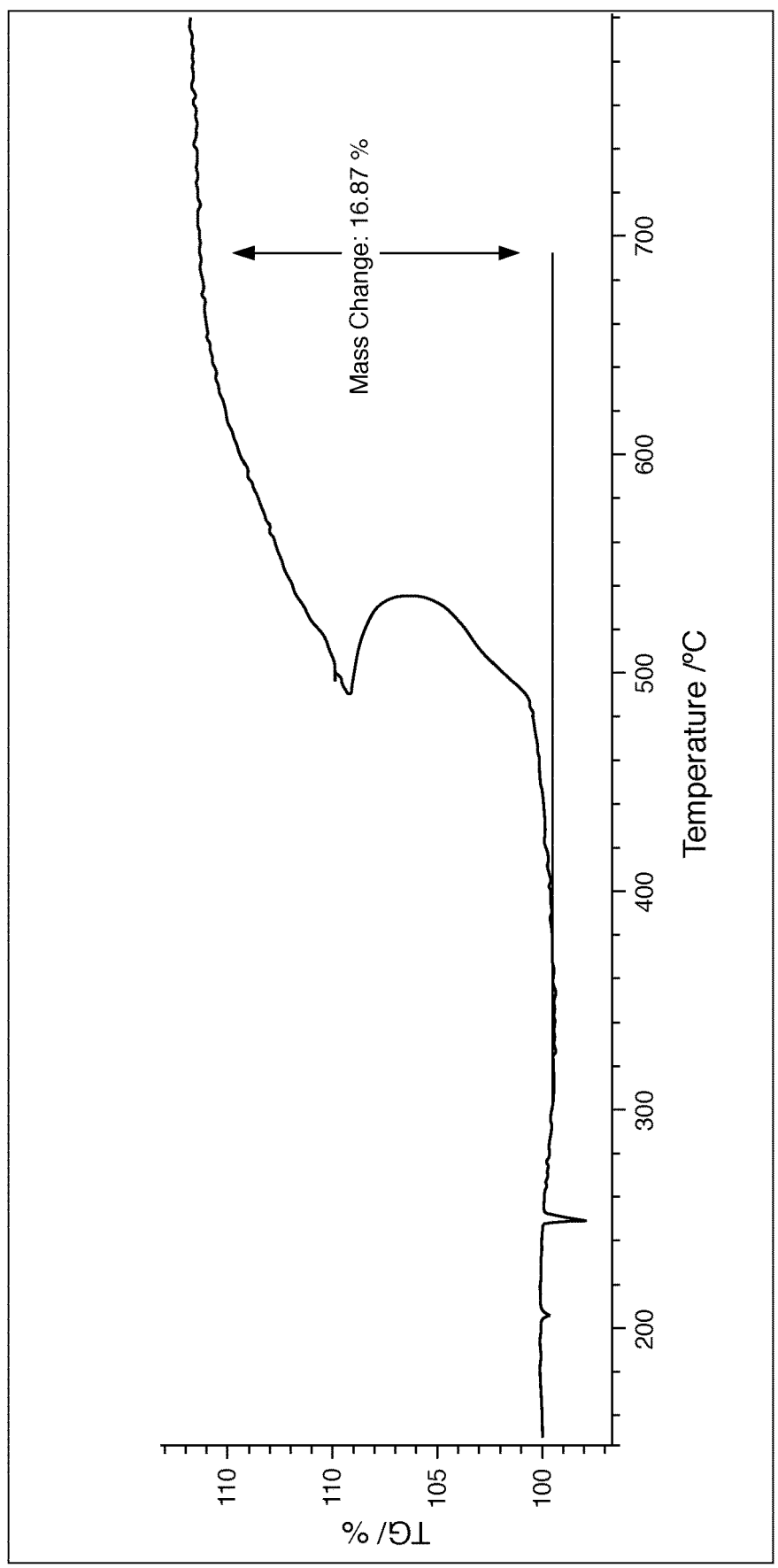
FIG. 1 is the thermogravimetric (TG) analysis of $U_3Si_2$ pellets, in which mass gain of $U_3Si_2$ pellet is measured as a function of temperature at the heating rate of 2.5° C./min. in the water vapor atmosphere.

As used herein, the singular form of "a", "an", and "the" include the plural references unless the context clearly dictates otherwise. Thus, the articles "a" and "an" are used herein to refer to one or to more than one (i.e., to at least one) of the grammatical object of the article. By way of example, "an element" means one element or more than one element.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Further, any numerical range recited herein is intended to include all sub-ranges subsumed therein. For example, a range of "1 to 10" is intended to include any and all sub-ranges between (and including) the recited minimum value of 1 and the recited maximum value of 10, that is, having a minimum value equal to or greater than 1 and a maximum value of equal to or less than 10.

A method of forming a water resistant boundary on fissile material for use in a water cooled nuclear reactor comprises coating the fissile material to a desired thickness with a suitable coating material. The fissile material may be any suitable fissile material. $U_3Si_2$ is an exemplary fissile material for this process, and for the reasons expressed above, is a preferred material in many aspects. Although the coating method described herein may be used with other fissile materials, such as $UO_2$, for convenience, the fissile material may be referred to as $U_3Si_2$.

As a promising candidate for next generation fuel, $U_3Si_2$ offers: 1. a higher thermal conductivity than $UO_2$; 2. a higher uranium loading than $UO_2$; and 3. a melting temperature that allows the fuel to stay solid under light water reactor normal operating and transient conditions. To counter the poor water resistance of $U_3Si_2$ at higher temperatures (e.g., 360° C. and above), in various aspects, a water resistant coating may be applied to one or both of $U_3Si_2$ pellets and the $U_3Si_2$ grain boundaries, which will prevent, or at least substantially slow, the contact of $U_3Si_2$ with water and therefore improves the water resistance of the fuel pellets if a leak in the fuel cladding occurs.

The coating material in various aspects, should form a robust coating over at least the exposed portions of the fissile material, such as on the pellets and grain boundaries. The term "robust coating", as used herein, is a coating that has low solubility in coolant, is easy to apply, does not react with the fissile material of choice, and has some flexibility as the pellet swells during irradiation. A "low solubility" as used herein is a relative term and means for purposes of this application that the solubility of the coating material is at least as low as, and in various aspects, less than, the solubility of $UO_2$ when $UO_2$ is used as a fissile material.

The coating materials may be any material that will coat, i.e., adhere to, the surface of the fissile material of choice and not react with the fissile material. As stated, the coating material in various aspects, has a solubility at least as good as, and preferably less than, that of $UO_2$. Solubility values for $UO_2$ are available in the literature.

In various aspects, the coating material is flexible enough to remain substantially in place as the fissile material swells in use. Those skilled in the art understand that fissile material swells in use because as fission occurs, the original atom forms two atoms of less dense material than the original atom. In addition, gas may be trapped at the grain boundaries which will cause more swelling. Those skilled in the art can calculate roughly the degree of swelling, but because of the trapped gas, swelling calculations in advance of use in a reactor may not be precise. The coating should be sufficiently flexible to avoid delamination as the fissile material swells. Some deviation, however, may be tolerated allowing a crack or delaminated portion in the coating upon swelling of the fissile material. In such instances, the coating still functions to reduce the exposure of the fissile material to the water or steam, thereby slowing oxidation and contributing to the useful life of the fissile material. Reducing the rate of oxidation of the fissile material in the event of exposure to water or steam will allow time for corrective action in the event of a beyond design basis accident.

In various aspects, a suitable coating material may be selected from the group consisting of $ZrSiO_4$, FeCrAl, Cr, Zr, Al—Cr, CrAl, $ZrO_2$, $CeO_2$, $TiO_2$, $SiO_2$, $UO_2$, $ZrB_2$, $Na_2O$—$B_2O_3$—$SiO_2$—$Al_2O_3$ glass, $Al_2O_3$, $Cr_2O_3$, carbon, and SiC, and combinations thereof. Coating of the $U_3Si_2$ grains can be accomplished by adding FeCrAl, CrAl, or $Na_2O$—$B_2O_3$—$SiO_2$—$Al_2O_3$ glass solids to the $U_3Si_2$ powder that melt at temperatures less than $U_3Si_2$ (1662° C.) but at the sintering temperature of the $U_3Si_2$ pellets (1200 to 1600° C.). In various aspects, the coating may be formed by deposition of particles selected from the group consisting of $ZrSiO_4$, FeCrAl, Cr, Zr, Al—Cr, CrAl, $ZrO_2$, $CeO_2$, $TiO_2$, $SiO_2$, $UO_2$, $ZrB_2$, $Na_2O$—$B_2O_3$—$SiO_2$—$Al_2O_3$ glass, $Al_2O_3$, $Cr_2O_3$, carbon, and SiC, and combinations thereof. Each of these materials has better water resistance than $U_3Si_2$. A coating can be applied to each $U_3Si_2$ pellet's circumferential, or side, surface and optionally applied to its top and bottom surfaces. Fuel pellets may be any shape and reference to circumferences or other surface contours are for convenience and are not limiting. In use, fuel pellets are typically in the form of generally cylindrical pellets stacked on end to form a generally cylindrical column which is held against the end plug of a fuel rod by means of a spring at the top end of the stack of pellets in the rod positioned between the top pellet and the top end plug of the fuel rod. In this configuration, the tops and bottoms of the pellets are not exposed to any water that might leak into the fuel rod. Any exposure to oxidizing fluids, if at all, will be minimal.

To enhance commercial viability, the coating material is preferably easy to apply. The coating step used in the method may be any suitable coating process. For example, coating may be done by a physical vapor deposition process or by atomic layer deposition (ALD). The coating process may, for example, be a thermal spray process, such as a hot or cold spray process or a plasma arc spray process.

Atomic Layer Deposition (ALD) is a thin film deposition method in which a film is grown on a substrate by exposing its surface to alternate gaseous species. ALD is based on the sequential use of a gas phase chemical process. The majority of ALD reactions use two chemicals, called precursors. These precursors react with the surface of a material one at a time in a sequential, self-limiting, manner, so that the reaction terminates once all the reactive sites on the surface are consumed. Consequently, the maximum amount of material deposited on the surface after a single exposure to all of the precursors (a so-called ALD cycle) is determined by the nature of the precursor-surface interaction. Through the repeated exposure to separate precursors, a thin film is slowly deposited. By varying the number of cycles it is possible to grow materials uniformly and with high precision on arbitrarily complex and large substrates. In contrast to chemical vapor deposition, the precursors are never present simultaneously in the deposition chamber, but they are inserted as a series of sequential, non-overlapping pulses. In ALD, the water resistant coating would be grown on the $U_3Si_2$ pellet surface by exposing the $U_3Si_2$ pellet to gaseous precursors of the desired coating material.

The precursors chosen for the deposition also contain a carrier gas. The temperature used in the deposition may range from 25° C. to 600° C., preferably from 200° C. to 450° C., and more preferably from 265° C. to 350° C., or other temperatures with any of the foregoing ranges. Temperatures greater than 600° C. should be avoided.

Alternatively, deposition of the coating may be by sputtering or chemical vapor deposition. In a typical chemical vapor deposition process, the substrate is exposed to one or more reactive precursors, which react and/or decompose on the substrate surface to produce the desired deposit. Frequently, by-products are also produced, which are removed by gas flow through a reaction chamber.

A suitable thermal deposition method, in various aspects, includes either a hot spray or cold spray methods. In a hot thermal spray process, the coating feedstock material is melted by a heat source or by plasma created by a high frequency arc between an anode and a tungsten cathode (i.e. plasma arc spray). This softened liquid or molten material is then carried by process gas and would be sprayed onto the surface $U_3Si_2$ pellets. On the $U_3Si_2$ pellet surface, this material solidifies and forms a solid layer.

A cold spray method may proceed by delivering a carrier gas to a heater where the carrier gas is heated to a temperature sufficient to maintain the gas at a desired temperature, for example, from 100° C. to 1200° C., after expansion of the gas as it passes through the nozzle. In various aspects, the carrier gas may be pre-heated to a temperature between 200° C. and 1200° C., with a pressure, for example, of 5.0 MPa. In certain aspects, the carrier gas may be pre-heated to a temperature between 200° C. and 1000° C., or in certain aspects, 300° C. and 900° C. and in other aspects, between 500° C. and 800° C. The temperature will depend on the Joule-Thomson cooling coefficient of the particular gas used as the carrier. Whether or not a gas cools upon expansion or compression when subjected to pressure changes depends on the value of its Joule-Thomson coefficient. For positive Joule-Thomson coefficients, the carrier gas cools and must be preheated to prevent excessive cooling which can affect the performance of the cold spray process. Those skilled in the art can determine the degree of heating using well known calculations to prevent excessive cooling. See, for example, for $N_2$ as a carrier gas, if the inlet temperature is 130° C., the Joule-Thomson coefficient is 0.1° C./bar. For the gas to impact the tube at 130° C. if its initial pressure is 10 bar (~146.9 psia) and the final pressure is 1 bar (~14.69 psia), then the gas needs to be preheated to about 9 bar*0.1° C./bar or about 0.9 C to about 130.9° C.

For example, the temperature for helium gas as the carrier is preferably 450° C. at a pressure of 3.0 to 4.0 MPa, and the temperature for nitrogen as the carrier may be 1100° C. at a pressure of 5.0 MPa, but may also be 600° C.-800° C. at a pressure of 3.0 to 4.0 MPa. Those skilled in the art will recognize that the temperature and pressure variables may change depending on the type of the equipment used and that equipment can be modified to adjust the temperature, pressure and volume parameters.

Suitable carrier gases are those that are inert or are not reactive, and those that particularly will not react with the particles or the substrate. Exemplary carrier gases include nitrogen ($N_2$), hydrogen ($H_2$), argon (Ar), carbon dioxide ($CO_2$), and helium (He).

There is considerable flexibility in regard to the selected carrier gases. Mixtures of gases may be used. Selection is driven by both physics and economics. For example, lower molecular weight gases provide higher velocities, but the highest velocities should be avoided as they could lead to a rebound of particles and therefore diminish the number of deposited particles.

The cold spray process relies on the controlled expansion of the heated carrier gas to propel the particles onto the substrate. The particles impact the substrate or a previous deposited layer and undergo plastic deformation through adiabatic shear. Subsequent particle impacts build up to form the coating. The particles may also be warmed to temperatures one-third to one-half the melting point of powder expressed in degrees Kelvin before entering the flowing carrier gas in order to promote deformation. The nozzle is rastered (i.e., sprayed in a pattern in which an area is sprayed from side to side in lines from top to bottom) across the area to be coated or where material buildup is needed.

Figure 3:
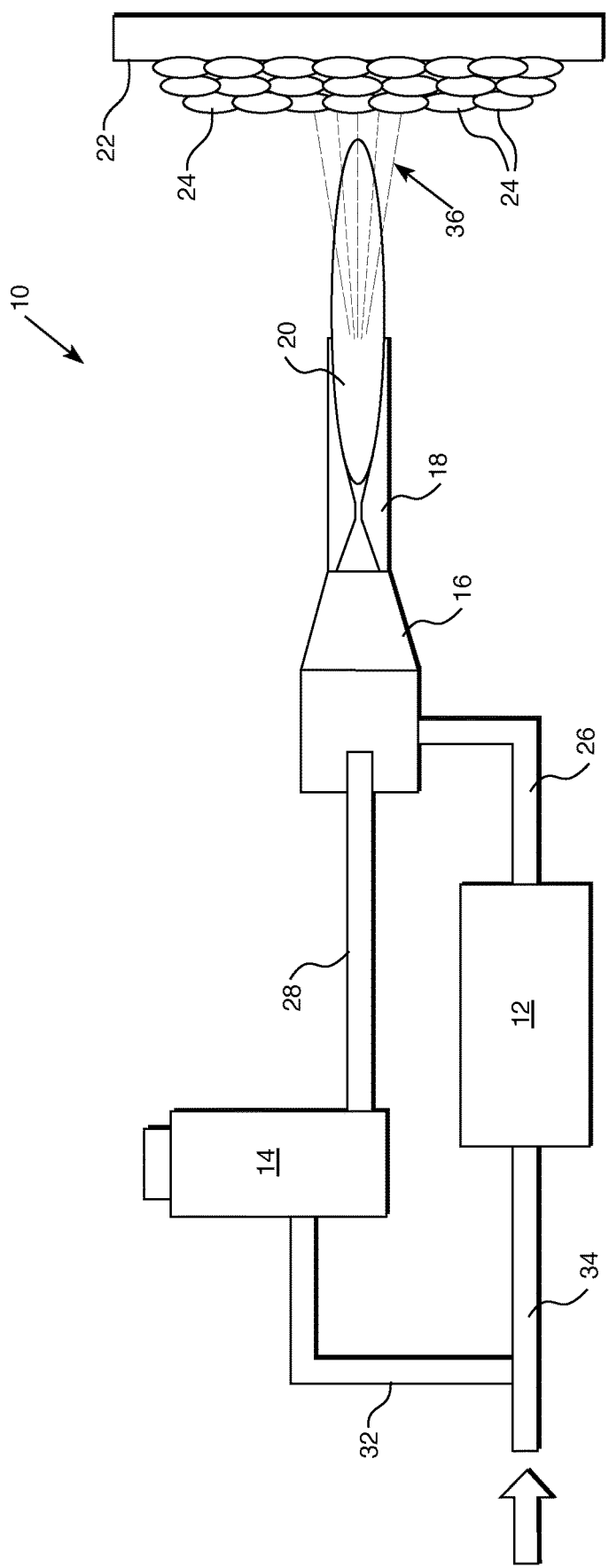
FIG. 3 is a schematic illustration of an exemplary thermal deposition spray process.

Referring to FIG. 3, a thermal spray assembly 10 is shown. Assembly 10 includes a heater 12, a powder or particle hopper 14, a gun 16, nozzle 18 and delivery conduits 34, 26, 32 and 28. High pressure gas enters conduit 34 for delivery to heater 12, where heating occurs quickly; substantially instantaneously. When heated to the desired temperature, the gas is directed through conduit 26 to gun 16. Particles held in hopper 14 are released and directed to gun 16 through conduit 28 where they are forced through nozzle 18 towards the substrate 22 by the pressurized gas jet 20. The sprayed particles 36 are deposited onto substrate 22 to form a coating comprised of particles 24. This process generally describes both cold spray and hot spray assemblies. The hot spray process occurs at a temperature hot enough to soften or melt the particles being deposited.

Figure 4:
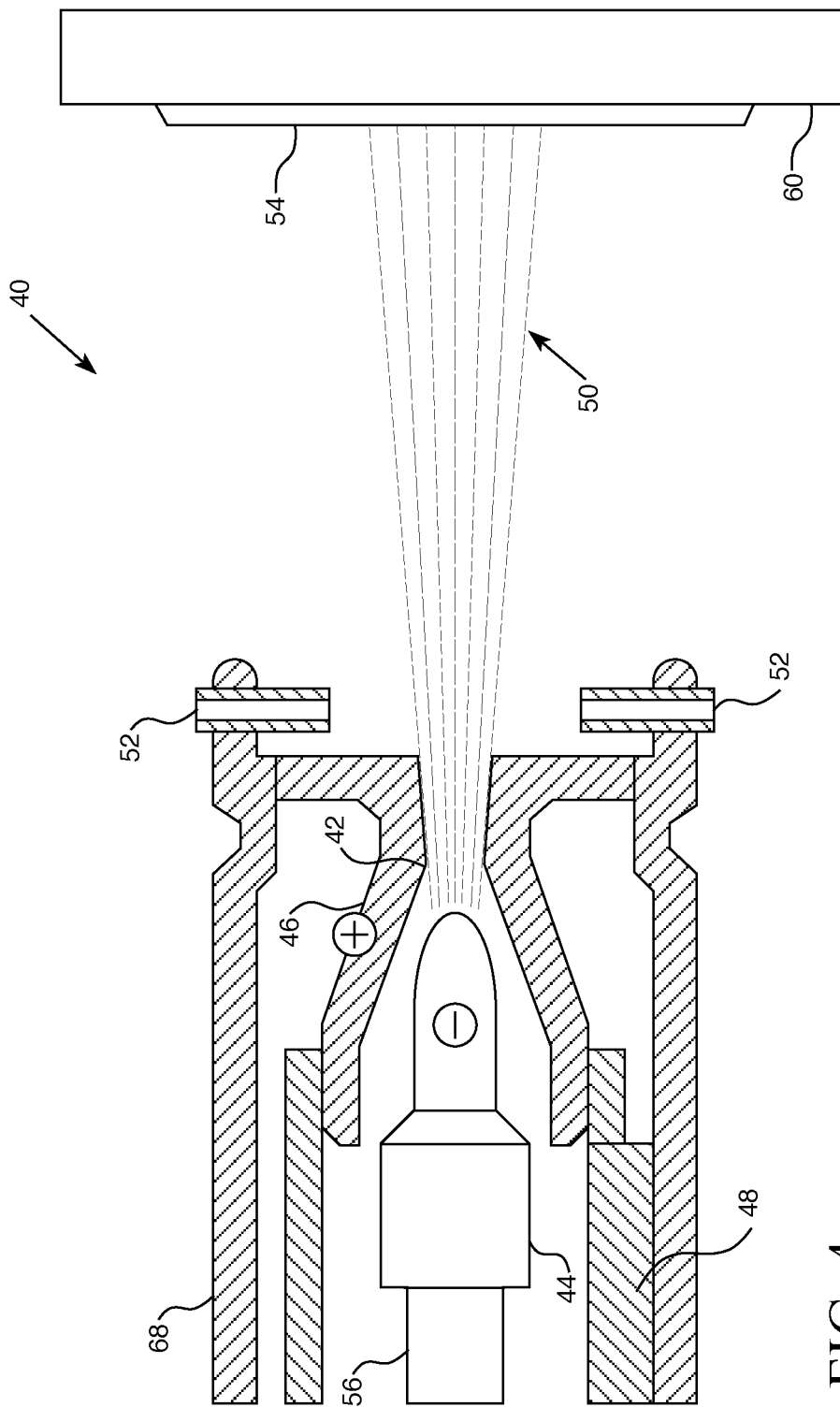
FIG. 4 is a schematic illustration of an exemplary plasma arc process.

An alternative coating method, in various aspects, includes a plasma arc spray process, such as that shown in FIG. 4. A plasma torch 40 generates a hot gas jet 50. A typical plasma torch 40 includes a gas port 56, a cathode 44, an anode 46, and a water cooled nozzle 42, all surrounded by an insulator 48 in a housing 68. A high frequency arc is ignited between the electrodes, i.e., between the anode 46 and a tungsten cathode 44. A carrier gas flowing through the port 56 between the electrodes 44/46 is ionized to form a plasma plume. The carrier gas may be helium (He) hydrogen ($H_2$), nitrogen ($N_2$), or any combination thereof. The jet 50 is produced by an electric arc that heats the gas as the pressurized gas expands through nozzle 42. The heated gas forms an arc plasma core which operates, for example, at 12,000° C. to 16,000° C. The gases expand as a jet 50 through the water cooled nozzle 42. Powders, or particles, are injected through ports 52 into the hot jet 50 where they are softened or melted, and forced onto the substrate 60 to form a coating 54. The rate of spray may be, for example, from 2 to 10 kg/hour at a particle velocity of about 450 m/s or less. The coating thickness achieved with thermal sprays, such as plasma arc sprays, varies depending on the material sprayed, but can range, for example, from 0.005 to 5 mm. A typical thickness for the coatings described herein may be from 5 to 1000 microns, and in various aspects, the thickness of the coating may be from 10 to 100 microns.

The thickness of the water-resistant coating varies from 10 microns to 200 microns for plasma arc spray applied coatings, and 1 micron to 20 microns for physical vapor deposited coatings and from 0.5 microns to 2 microns for ALD. The coating materials include $ZrSiO_4$, FeCrAl, Cr, Zr, Al—Cr, CrAl, $ZrO_2$, $CeO_2$, $TiO_2$, $SiO_2$, $UO_2$, $ZrB_2$, $Na_2O$—$B_2O_3$—$SiO_2$—$Al_2O_3$ glass, $Al_2O_3$, $Cr_2O_3$, carbon, and SiC, and combinations thereof. $U_3Si_2$ has less cracking compared to $UO_2$ in operation due to a much higher thermal conductivity. Even if cracking is developed, the coating can still cover substantial surface area of $U_3Si_2$ pellet to prevent it from excess oxidation.

In addition, burnable absorbers can also be coated by using either an ALD process or a thermal spray process on the circumferential surface of the coated $U_3Si_2$ pellets. The integral fuel burnable absorber may be a thin layer of a zirconium compound, such as zirconium diboride ($ZrB_2$), a boron compound, such as $B_2O_3$—$SiO_2$ glass, and combinations of a zirconium compound and a boron compound coated on the fuel pellets following application of the water resistant coating layer. See for example, U.S. Pat. No. 4,751,041, incorporated herein by reference.

Burnable absorbers are a type of burnable poison used to control the core reactivity in nuclear reactor operation. These burnable absorbers provide temporary reactivity control primarily effective during the beginning of a reactor cycle and compensates for the excess reactivity present early in cycle due to the loading of fresh fuel. The layer of burnable absorber material is applied after the water resistant layer is applied, so that it overlays the water resistant coating layer.

Oxidation of $U_3Si_2$ is a potential safety concern and one of the key issues for implementation of $U_3Si_2$ fuel in light water reactors. Coating on $U_3Si_2$ will slow down oxidation especially at higher steam temperatures, and is one of the economic methods to solve the potential safety concerns.

Figure 2:
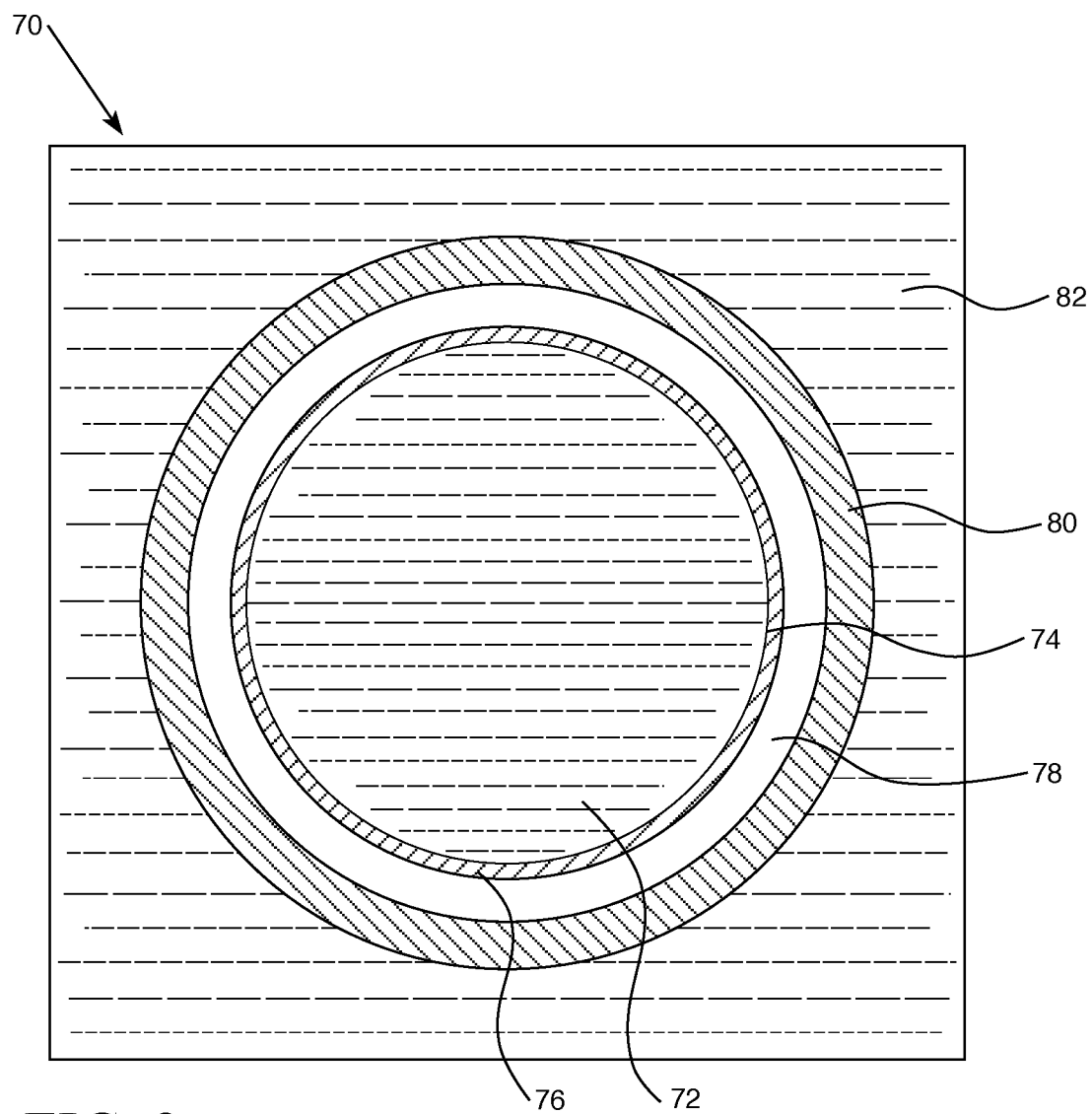
FIG. 2 is a schematic representation of the cross-section of a fuel pellet in a fuel rod showing the relative position of the protective coating layer and the fuel burner absorber layer.

The method as described herein produces coated fissile material, such as a coated fuel pellet shown in FIG. 2. A plurality of pellets are typically stacked in a fuel rod 70. The fissile material 72 in various aspects comprises $U_3Si_2$ coated with a water resistant layer 74 selected from the group consisting of $ZrSiO_4$, FeCrAl, Cr, Zr, Al—Cr, CrAl, $ZrO_2$, $CeO_2$, $TiO_2$, $SiO_2$, $UO_2$, $ZrB_2$, $Na_2O$—$B_2O_3$—$SiO_2$—$Al_2O_3$ glass, $Al_2O_3$, $Cr_2O_3$, carbon, and SiC, and combinations thereof. The fuel pellet may also comprise an overlayer 76 of a burnable absorber material, such as zirconium diboride ($ZrB_2$), a boron compound, such as $B_2O_3$—$SiO_2$ glass, and combinations of a zirconium compound and a boron compound. There may be a gap 78 filled with a gas, such as helium, between the overlayer 76 and the fuel cladding 80. The exterior of the cladding 80 is surrounded by a coolant 82, typically water in a water cooled reactor.

The present invention has been described in accordance with several examples, which are intended to be illustrative in all aspects rather than restrictive. Thus, the present invention is capable of many variations in detailed implementation, which may be derived from the description contained herein by a person of ordinary skill in the art.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative embodiments. The embodiments described herein are understood as providing illustrative features of varying detail of various embodiments of the disclosed invention; and therefore, unless otherwise specified, it is to be understood that, to the extent possible, one or more features, elements, components, constituents, ingredients, structures, modules, and/or aspects of the disclosed embodiments may be combined, separated, interchanged, and/or rearranged with or relative to one or more other features, elements, components, constituents, ingredients, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

What is claimed is:

1. A method comprising:
   coating a fissile material with a water resistant layer, the layer being non-reactive with the fissile material,
   wherein the fissile material is in the form of a pellet, and the coating is applied to a surface of the fissile material.

2. The method recited in claim 1 wherein the fissile material is $U_3Si_2$.

3. The method recited in claim 1 wherein the water resistant layer is selected from the group consisting of $ZrSiO_4$, FeCrAl, Cr, Zr, Al—Cr, CrAl, $ZrO_2$, $CeO_2$, $TiO_2$, $SiO_2$, $UO_2$, $ZrB_2$, $Na_2O$—$B_2O_3$—$SiO_2$—$Al_2O_3$ glass, $Al_2O_3$, $Cr_2O_3$, carbon, and SiC, and combinations thereof.

4. The method recited in claim 1 wherein the coating is applied by atomic layer deposition.

5. The method recited in claim 4 wherein the thickness of the coating is from 0.5 microns to 2 microns.

6. The method recited in claim 1 wherein the coating is applied by a thermal spray process.

7. The method recited in claim 6 wherein the thermal spray process is physical vapor deposition.

8. The method recited in claim 7 wherein the thickness of the coating is from 1 micron to 20 microns for a physical vapor deposited coating.

9. The method recited in claim 6 wherein the thermal spray process is a plasma arc spray.

10. The method recited in claim 9 wherein the thickness of the coating is from 1 micron to 200 microns.

11. The method recited in claim 6 wherein the thermal spray process is a cold spray process.

12. The method recited in claim 6 wherein the thermal spray process is a hot spray process.

13. The method recited in claim 1 further comprising a layer of burnable absorbers over the water resistant layer.

14. The method recited in claim 13 wherein the burnable absorbers are selected from the group consisting of $ZrB_2$, $B_2O_3$—$SiO_2$ glass, and combinations thereof.

15. A fuel for use in a nuclear reactor comprising:
a fissile material coated with a water resistant layer,
wherein the fissile material is in the form of a pellet, and the coating is applied to a surface of the fissile material.

16. The fuel recited in claim 15 wherein the water resistant layer is selected from the group consisting $ZrSiO_4$, FeCrAl, Cr, Zr, Al—Cr, CrAl, $ZrO_2$, $CeO_2$, $TiO_2$, $SiO_2$, $UO_2$, $ZrB_2$, $Na_2O$—$B_2O_3$—$SiO_2$—$Al_2O_3$ glass, $Al_2O_3$, $Cr_2O_3$, carbon, and SiC, and combinations thereof.

17. The fuel recited in claim 15 wherein the fissile material is $U_3Si_2$.

18. The fuel recited in claim 15 further comprising an integral fuel burnable absorber layer over the water resistant layer for controlling the core reactivity in nuclear reactor operation.

19. The fuel recited in claim 18 wherein the absorber layer is selected from the group consisting of $ZrB_2$, $B_2O_3$—$SiO_2$ glass, and combinations thereof.

20. A method comprising:
coating a fissile material with a water resistant layer, the layer being non-reactive with the fissile material; and
inserting the coated fissile material into a cladding,
wherein the fissile material is in the form of a pellet, and the coating is applied to a surface of the fissile material.

\* \* \* \* \*